Dec. 19, 1961  O. L. UNRUH  3,013,682
BALE STACKER AND UNLOADER
Filed Dec. 24, 1957  3 Sheets-Sheet 1
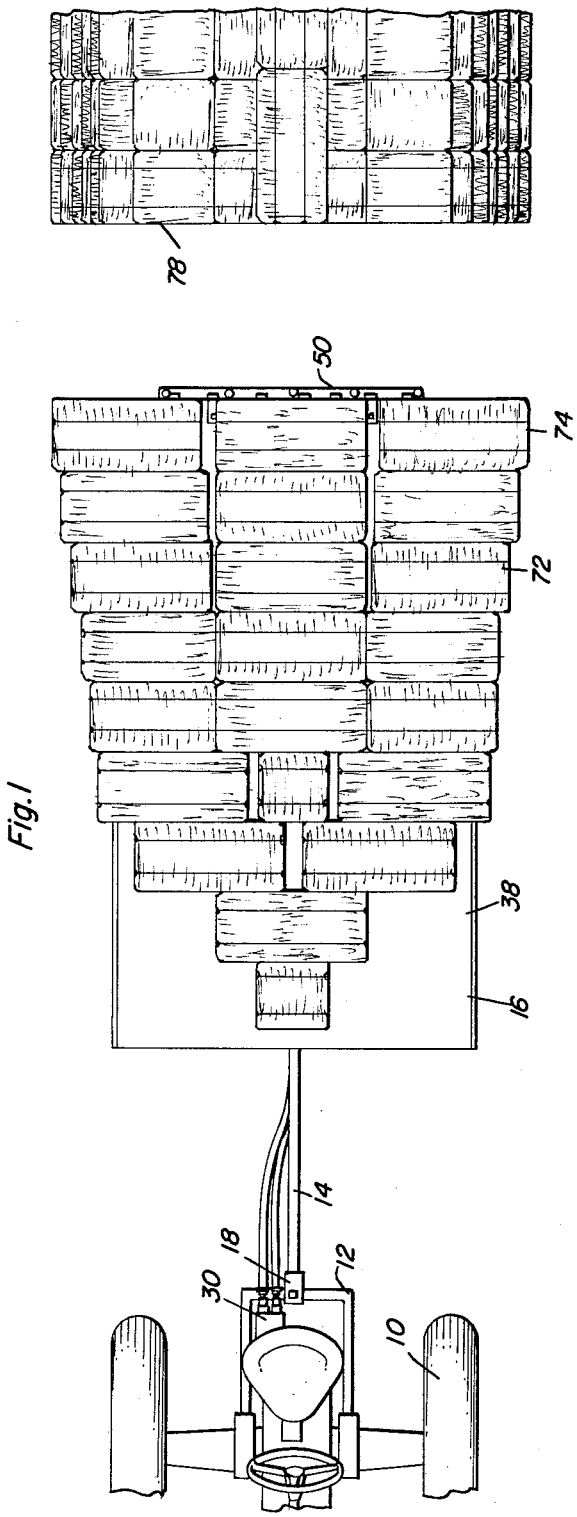
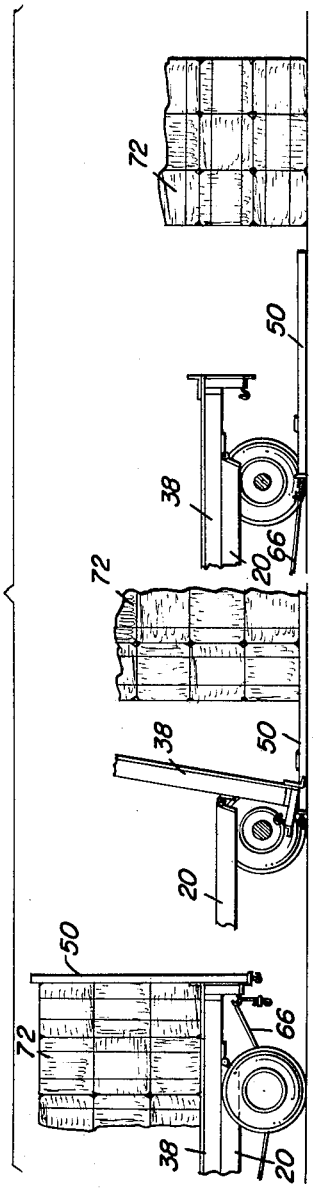
Orville L. Unruh
INVENTOR.

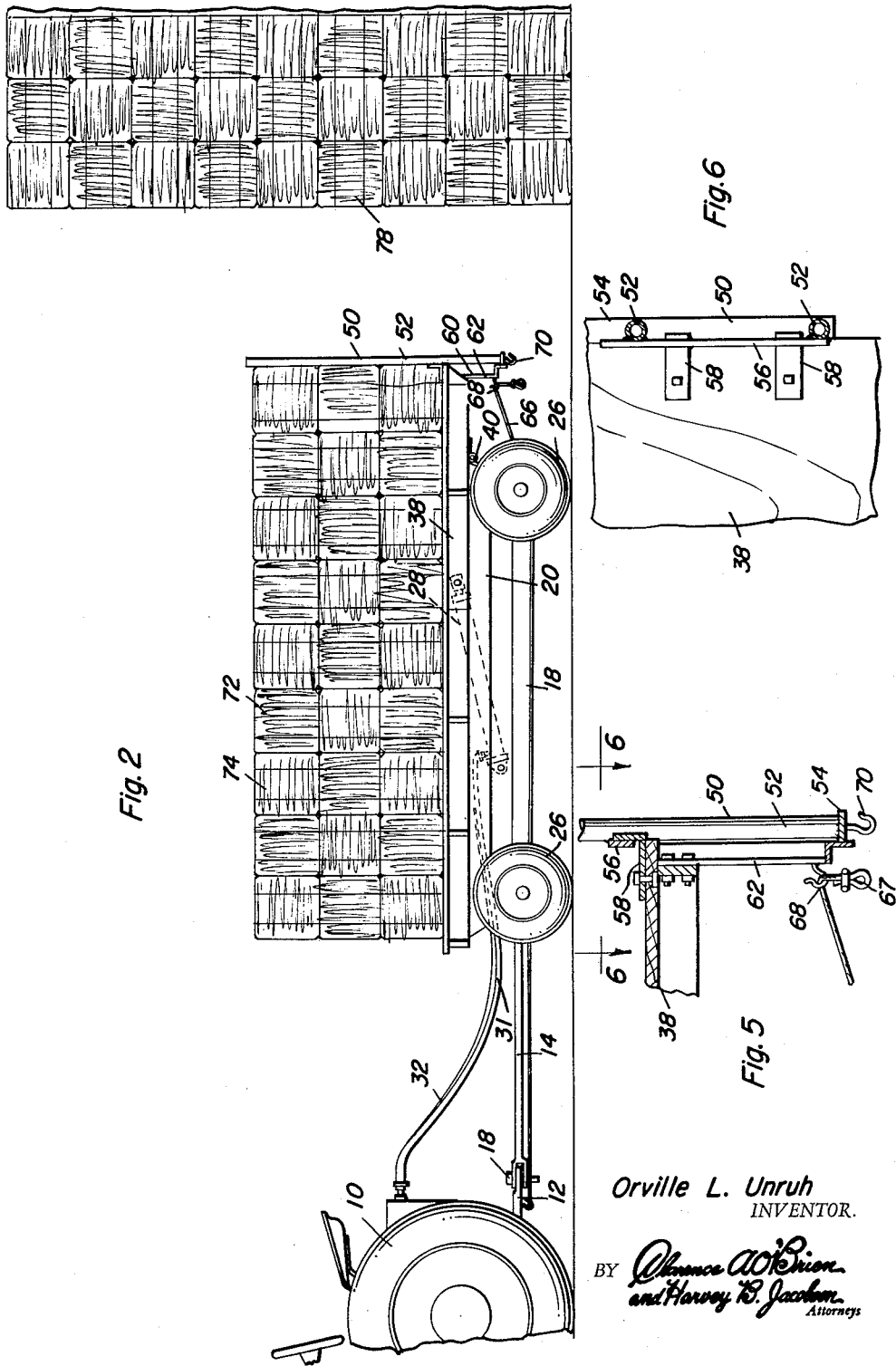

Dec. 19, 1961     O. L. UNRUH     3,013,682
BALE STACKER AND UNLOADER
Filed Dec. 24, 1957     3 Sheets-Sheet 3
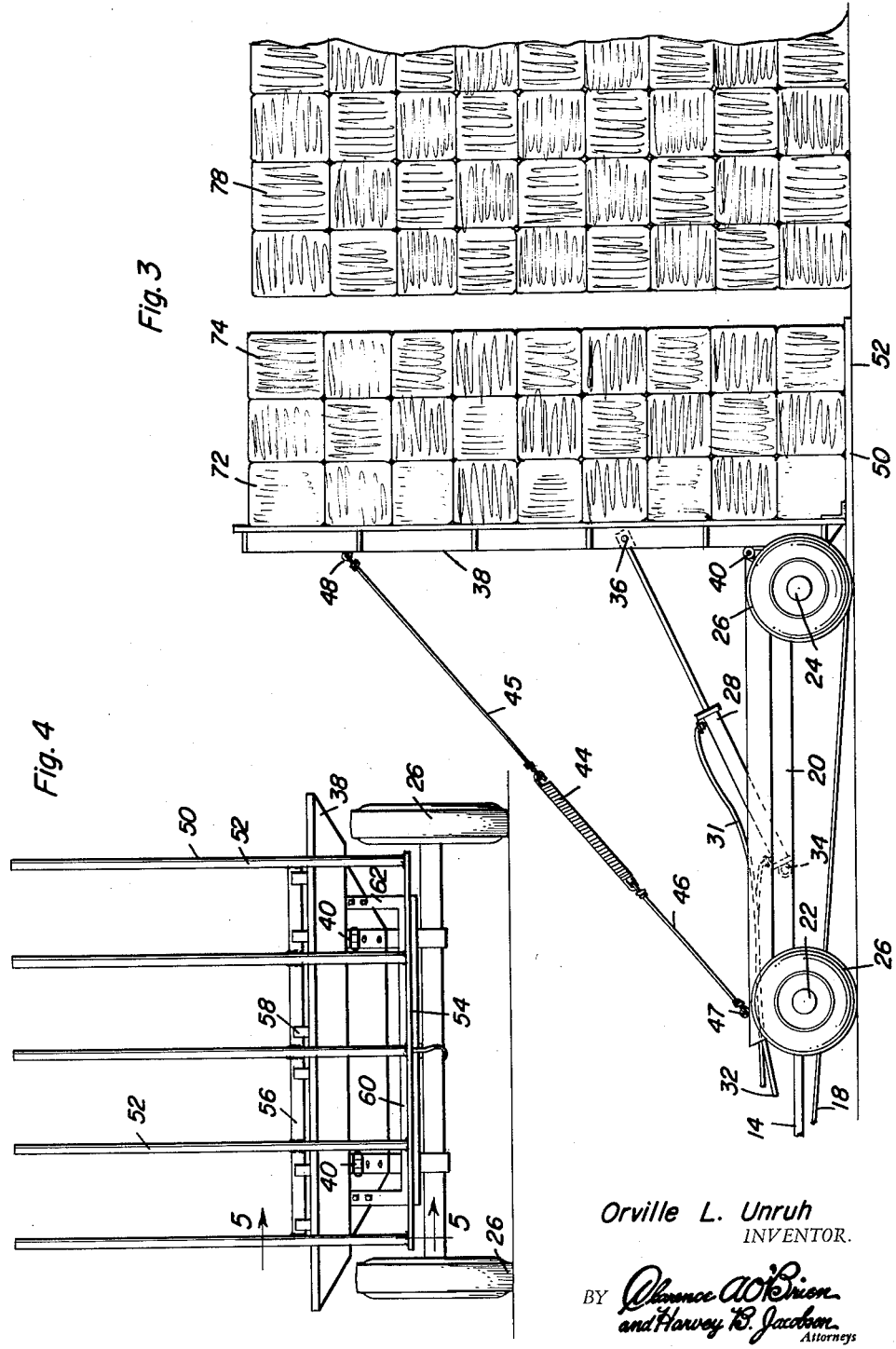
Orville L. Unruh
INVENTOR.

United States Patent Office 3,013,682
Patented Dec. 19, 1961

3,013,682
BALE STACKER AND UNLOADER
Orville L. Unruh, Marion, S. Dak.
Filed Dec. 24, 1957, Ser. No. 704,976
10 Claims. (Cl. 214—501)

This invention relates to farm equipment and more particularly to improvements in a farm vehicle enabling that vehicle to simultaneously unload and stack bales in a neat and orderly fashion.

A considerable amount of hand labor and effort is involved in properly stacking bales of hay on a farm. Proper stacking takes not only time but effort in lifting the bales very high and interlocking them while so lifting.

One of the difficulties is that the bales have to be collected from the field where they are strewn by the hay baler, and then carried to the location where the farmer wants them stacked. This means hand loading a trailer or truck and then unloading, again by hand, and stacking.

One of the principal objects of this invention is to provide a wagon or truck with means by which to avoid one of the hand operations described above. My invention makes it possible to arrange the bales properly on the flat body as they are to be stacked when placed generally vertically or upright. Then, at the site of the stack, the body is tilted to a generally upright position and the farm vehicle backed up until the bales on the body of the vehicle are pressed neatly and tightly against the existing stack. Then by moving the farm vehicle forward a slight distance, a matter of an inch or two, the endgate of the vehicle on which the bales are supported, become separated from the body of the vehicle leaving the bales that were previously on the body resting in an upright position on the now detached endgate. Thereafter the endgate can be withdrawn from beneath the bales by attaching of a chain or cable to the endgate and further moving the vehicle forward. The cable or chain could be attached to the draft vehicle, for example a tractor or truck or attached to the wagon, it being suggested that the tractor be used although this is purely optional.

A further object of the present invention is to provide a practical farm vehicle where the loading takes place on a flat approximately horizontal surface of the body, after which the vehicle unloads by tilting the body to an upright position so that the load is temporarily supported on the endgate. However when the vehicle body reaches a particular position, the endgate detaches with the load remaining on it. Momentarily, then, the endgate functions as a pallet on which the load is supported.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top view of a wagon constructed in accordance with the invention and being drawn by a fragmentarily illustrated tractor.

FIGURE 2 is a side view of the wagon in FIGURE 1.

FIGURE 3 is an elevational view showing the wagon as it is being unloaded.

FIGURE 4 is a rear elevational view of the wagon.

FIGURE 5 is a sectional view taken on line 5—5 of FIGURE 4 and showing principally the coupling which attaches the endgate to the body of the wagon but which automatically releases during the unloading operation.

FIGURE 6 is a sectional view taken on the line 6—6 of FIGURE 5.

FIGURE 7 is a group of fragmentary illustrations showing the unloading of the wagon.

There is tractor 10 fragmentarily shown. This tractor has a hydraulic power supply and drawbar 12 to which tongue 14 of the wagon 16 is attached. A standard coupling 18 is used to make the attachment. Wagon 16 is constructed of a main frame 20 having front and rear axles 22 and 24 with wheels 26 at the ends thereof. The frame is provided with a hydraulic cylinder 28 that is operatively connected with hydraulic power take-off 30 of the tractor by hoses 31 and 32. The hydraulic power take-off controls on the tractor are used for energizing the hydraulic cylinder 28.

One end of the hydraulic cylinder is mounted on a pivot 34 of frame 20 while the other end is mounted on a pivot 36. This pivot is connected to body 38, the latter having a flat upper surface on which to support a load. Hinge 40 is connected to the rear part of the frame 20 and to the bottom part of body 38 near, but slightly spaced inwardly from the rear end of the body 38. The distance between hinge 40 and the extreme rear end of the body 38 is as near as possible to the distance between the ground and the axis of hinge 40 so that when the body is tilted to an upright position (see FIGURE 3) the lower end of the body will be approximately at the ground level.

A stout return spring 44 is connected at its ends to cables 45 and 46. These are attached to eyes 47 and 48. The eyes are secured to the frame 20 and to the body 38. When the body 38 is pivotally operated beyond a particular elevation, spring 44 begins to stretch to provide a yielding return bias for the body 38.

Endgate 50 constitutes an important part of my invention. The endgate is made of a plurality of bars 52 whose lower ends are secured to a frame member 54. An intermediate frame member 56 is welded to each of the bars and is parallel to the lower frame member 54. This holds the bars uniformly and rigidly spaced. Frame member 56 constitutes a part of a quick release coupling for the endgate. A plurality of hooks 58, each being L-shaped, are secured to the body 38 at the rear edge thereof. A leg of each L-shaped hook extends upwardly and fits behind the frame member 56 between bars 52 thereby supporting the frame member and holding it against downward displacement. The endgate is prevented from rotary displacement by a stop or abutment 60 in the form of a depending frame 62 which is secured to the structural framework of body 38 and which depends from the rear end thereof. As seen in FIGURE 5 the endgate can be easily lifted from the body 38 and detached. However it cannot be detached by pushing, pulling or depressing the endgate while it is in the upright position.

Cable 66 has an eye 67 at one end and is placed over or connected with hook 68 on frame 62. This is the ordinary position for the cable whose inner end is attached either to the tractor 10 or to the wagon. Hook 70 on frame member 54 has the loop 67 of cable 66 attached to it when withdrawing the endgate from beneath the load as will be subsequently described.

In operation the surface of body 38 is loaded. Load 72 comprises the load for which the wagon was designed. However it is understood that loads other than the bales 74 may derive the benefits of my invention. When loading with bales 74, they are placed on the surface of body 38 just as they would appear when hand loaded in the vertical position. Three bales are spaced transversely across the rear end of the body 38 and against the endgate 50. Three additional bales are placed against the first bales and these are spaced slightly less. The stacking continues until near the front of the body where the arrangement is altered slightly in a number reduced as shown in FIGURE 1.

Instead of having to remove the bales 74 from the wagon and stacking them, the wagon is drawn to the stack 78 which has been previously made. Then the body 38 is tilted about its hinge or hinges 40 until the body assumes an upright position. At this time all the weight of the load 72 is on the endgate 50 and the vehicle is backed farther pushing the bales 74 against the previously stacked bales (see FIGURE 3). This packs bales 74 tightly to assure that there will be a good and solid stack.

As seen best in FIGURE 3, when the body 38 assumes an upright position there is nothing to prevent the endgate 50 from becoming uncoupled. This is done automatically by virtue of the construction of the coupling formed by hooks 58 engaging with frame member 56. Therefore, by moving the vehicle forward after the body 38 has been placed at a 90° angle, more or less, the endgate 50 together with the load 72 which is on it, becomes completely detached from the body 38. Cable 66 is attached to hook 70 and the endgate is then withdrawn from beneath the load 72, leaving it as a part of the stack 78. Then the endgate can be again attached to the body 38 so that the wagon can be used again for a further loading operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A bale stacker and unloader comprising a wagon that has a body and a frame to which said body is pivoted, an endgate against which the bales are adapted to rest when the body is pivotally actuated to the unloading position, and releasing means for attaching said endgate to said body and for releasing a loaded endgate in response to movement of the wagon from said body when the body has been pivotally moved to an approximately upright position and said endgate is approximately horizontally supported on a supporting surface.

2. A bale stacker and unloader comprising a wagon that has a body and a frame to which said body is pivoted, an endgate against which the bales are adapted to rest when the body is pivotally actuated to the unloading position, means for attaching said endgate to said body and for releasing the endgate from said body when the body has been pivotally moved to an approximately upright position, to thereby deposit on the ground said endgate with the bales thereon, and means for withdrawing said endgate from beneath the bales.

3. A bale stacker and unloader comprising a vehicle that has a body and a frame to which said body is pivoted, an endgate against which the bales are adapted to rest when the body is pivotally actuated to a generally upright position in which the bales can be pushed against previously stacked bales by moving the vehicle backward, coupling means connecting said endgate to said body and releasing said endgate when loaded in response to forward movement of said body when in said upright position to thereby leave the bales together with the endgate against said previously stacked bales.

4. A bale stacker and unloader comprising a wagon that has a body and a frame to which said body is pivoted, an endgate against which the bales are adapted to rest when the body is pivotally actuated to a generally upright position in which the bales can be pushed against previously stacked bales by moving the wagon backward, a coupling connecting said endgate to said body and releasably in response to forward movement of said body when in said upright position to thereby leave the bales and endgate against said previously stacked bales, and means connected with said endgate for withdrawing said endgate from beneath the bales.

5. The bale stacker and unloader of claim 3 wherein said coupling means includes a plurality of hooks between the opposite ends of said endgate and body, and an abutment carried by said body against which one end of said endgate bears.

6. A vehicle comprising a wheel supported frame, a body pivoted to the rear end of said frame, an upper surface on said body on which a load is adapted to be arranged, an endgate, coupling means releasably connecting said endgate to the body with the endgate constituting a support for the load as said body is pivoted to the unloading position at which the load is carried by said endgate, and said coupling means releasing said endgate from said body in response to movement of the body when said endgate is loaded and is approximately horizontal.

7. A vehicle comprising a wheel supported frame, a body pivoted to the rear end of said frame, a flat upper surface on said body on which a load is adapted to be arranged, an endgate, and means comprising a coupling connecting said endgate to the body and automatically releasing a loaded endgate from the body in response to movement of the body when in a generally upright position.

8. A vehicle comprising a wheel supported frame, a body pivoted to the rear end of said frame, a flat upper surface on said body on which a load is adapted to be arranged, an endgate, a coupling connecting said endgate to the body and automatically releasing said endgate from the body when the body is in a generally upright position and the body is moved forward, to thereby deposit the endgate and load on a supporting surface, and means for removing the endgate from beneath the load.

9. The subject matter of claim 8 wherein said means for removing the endgate from beneath the load include an elongate member attached to the vehicle, and means securing said elongate member to said endgate.

10. The subject matter of claim 9 wherein said coupling connecting said endgate to said body and automatically releasing said endgate from said body when the body is in a generally upright position and the body is moved forward including at least one hook assembly mechanically connected between said endgate and body and opening in a generally upward direction when the body is essentially horizontal.

References Cited in the file of this patent

UNITED STATES PATENTS

| | | |
|---|---|---|
| 1,096,350 | Brown | May 12, 1914 |
| 1,312,359 | Robinson | Aug. 5, 1910 |
| 1,361,706 | Flinchbaugh | Dec. 7, 1920 |
| 1,543,532 | Timidaiski | June 23, 1925 |
| 1,849,424 | Fontaine | Mar. 15, 1932 |
| 2,610,751 | Bevan | Sept. 16, 1942 |
| 2,675,139 | Mercier et al. | Apr. 13, 1954 |
| 2,726,115 | Babcock et al. | Dec. 6, 1955 |
| 2,785,818 | Mercier et al. | Mar. 19, 1957 |